(12) United States Patent
Chang et al.

(10) Patent No.: US 6,532,541 B1
(45) Date of Patent: Mar. 11, 2003

(54) METHOD AND APPARATUS FOR IMAGE AUTHENTICATION

(75) Inventors: Shih-Fu Chang, New York, NY (US); Ching-Yung Lin, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/235,862

(22) Filed: Jan. 22, 1999

(51) Int. Cl.[7] .............................. H04L 9/00; H04N 7/167
(52) U.S. Cl. ........................ 713/176; 380/216; 380/217
(58) Field of Search ................. 713/176; 380/216–217; 382/118, 119, 116, 113, 162–167, 246, 250

(56) References Cited

U.S. PATENT DOCUMENTS 5,208,857 A * 5/1993 Lebrat .......................... 380/49
5,887,061 A * 3/1999 Sato ............................. 380/49
6,037,984 A * 3/2000 Isanardi et al. ............. 713/176
6,058,186 A * 5/2000 Enari ........................... 380/29

* cited by examiner

Primary Examiner—Gilberto Barron
Assistant Examiner—Kambiz Zand
(74) Attorney, Agent, or Firm—Baker Botts LLP

(57) ABSTRACT

A system for authentication of a digital image includes a signature generator for creating a robust digital signature for an original image based on instrument features of the image. An authentication processor extracts a set of invariant features for the original image from the digital signature, generates a corresponding set of invariant features for the present image to be authenticated and compares the two sets of invariant features to determine whether the image has been subjected to malicious manipulation. The invariant features include the polarity and magnitude of the difference between discrete cosine transform coefficients at corresponding coefficient locations in selected image block pairs. The intensity of the original image is also authenticated by comparing a mean value of coefficient of the original image to the mean value of the coefficient of the present image.

13 Claims, 4 Drawing Sheets

METHOD AND APPARATUS FOR IMAGE AUTHENTICATION

BACKGROUND OF THE INVENTION

1. Field of the Invention

The present invention relates to image authentication, and more particularly relates to methods and apparatus for image authentication which distinguish unauthorized content-altering image alterations from content preserving manipulations, such as image compression.

2. Description of Related Art

With the recent growth in accessability of computers and digital cameras, the importance of digital images is constantly increasing. Digital images offer advantages over traditional photographic processes in ease of manipulation, storage and processing. However, the ease in which digital images can be altered significantly reduces the reliability which was once inherent in a photographic image.

To enhance the reliability of digital images, image authentication techniques have been pursued to detect malicious manipulation of an image. Previously, two techniques have been investigated: 1) generating a digital signature of the image at the point of origin, i.e., at the digital camera; and 2) embedding a secret code, or "watermark," related to the content of the image within the image.

The first method employs an encrypted digital signature which is generated by the image capturing device. Generally, the digital signature is based on a public key encryption method. In this type of method, a private key, known only to the capturing device, is used to encrypt a hashed version of an image to form the "signature" of the image which travels with the image. A public key is used to decrypt the signature. The public key is also used to hash the image and compare the codes of the current image to the original signature. If the codes match, the present image is considered authentic.

In the second method, a checksum value is generated corresponding to the bit values of the pixels forming the image. The checksum value is considered a fragile "watermark" for the image, as any alteration of the image will alter the checksum value and destroy the watermark. To authenticate an image, the current checksum value of the image is compared against the value of the watermark to verify that the values are equal.

Both of the above image authentication methods are limited in that any change in the image will result in a verification failure. However, certain image manipulations do not significantly alter the meaning of the image content and are considered desirable. For example, digital images are generally compressed prior to storage and data transmission in order to optimize the use of computer storage and data transmission resources. However, a very common image compression standard, JPEG (Joint Photographic Experts Group), results in a "lossy" compression of image data which irrevocably alters certain pixels in the image. Because JPEG compression alters the content of the image, the above described authentication methods cannot successfully verify an image after such lossy compression is applied.

FIGS. 1A and 1B illustrate systems known in the art for performing JPEG compression and decompression of a digital image, respectively. Referring to FIG. 1A, the source image 100, X, is grouped into ρ nonoverlapping 8×8 blocks, O FPIXELS i.e., $X = \cup_{p=1}^{\rho} X_p$. Each block is sent sequentially to a Discrete Cosine Transform (DCT) processor 102 to extract DCT coefficients for each block. Instead of representing each block, $X_p$, as a 8×8 matrix, each block can be represented as a 64×1 vector following the "zig-zag" order of the original matrix. Therefore, the DCT coefficients $F_p$, of the vector, $X_p$, can be considered as a linear transformation of $X_p$ with a 64×64 transformation matrix D, s.t., $$F_p = DX_p. \tag{1}$$

Each of the 64 DCT coefficients is applied to a quantizer 104 where the DCT coefficients are quantized with a 64-element quantization table Q 106. In JPEG compression, this table is used on all blocks of an image. (For color images, there could be three quantization tables for CrCb domains, respectively.) Quantization is defined as the division of each DCT coefficient by its corresponding quantizer step size, followed by rounding to the nearest integer:

$$\tilde{f}_p(v) \equiv \text{Integer Round}\left(\frac{F_p(v)}{Q(v)}\right) \tag{2}$$

where v=1 ... 64. In eq.(2), $\tilde{f}_p$ is the output of the quantizer. For the convenience of later discussion, we can define $\tilde{F}_p$, a quantized approximation of $F_p$, as $$\tilde{F}_p(v) = \tilde{f}_p(v) \cdot Q(v). \tag{3}$$

After quantization, the inter-block differences of DC coefficients are encoded by an entropy encoder 108. The AC terms are ordered following the "zig-zag" order. Both DC and AC coefficients are then entropy encoded. The final JPEG file, $\tilde{B}$ includes the Huffman table 110, the quantization table 106, the encoded data and some other information.

FIG. 1B illustrate a decoder suitable for decompressing an image subjected to JPEG compression. First, the decoder extracts and reconstructs the Huffman table 110 and quantization table 106 from the compressed image. Then the bitstream is sent to an entropy decoder 112 and a dequantizer 114 to substantially reconstruct the DCT coefficients of the original image. The output of dequantizer, $\tilde{F}_p$, is the same as that defined above in equation(3). An Inverse DCT (IDCT) processor 116 is then used to convert $\tilde{F}_p$ to the spatial-domain image block $\tilde{X}_p$.

$$\tilde{X}_p = D^{-1}\tilde{F}_p. \tag{4}$$

All blocks are then tiled to form a decoded image frame.

Theoretically, the results of the IDCT process will be real numbers. However, the brightness of an image is usually represented by an 8-bit integer from 0 to 255. Therefore, a rounding process which maps those real numbers to integers may be necessary. This process is performed after the IDCT processor 116 by processing block 118.

In addition to image compression, it is also desirable to allow certain other manipulations to an image while still verifying the remaining content as authentic. In some cases image cropping, image translation, image masking, global intensity alteration etc. may be allowable. However, as with lossy compression, present image authentication techniques cannot verify an image once such allowable image manipulations are performed.

The above-described prior art techniques fail to satisfy the growing need for robust image authentication which can distinguish between allowable image manipulations and malicious, content altering manipulations which are impermissible.

SUMMARY OF THE INVENTION

An object of the present invention is to provide robust image authentication methods and apparatus which distinguish malicious content based attacks of an image from allowable transformations of an image.

A further object of the present invention is to provide an image authenticator which accepts and authenticates images subjected to format transformation, lossless compression as well as acceptable forms of lossy compression.

Another object of the present invention is to provide an image authenticator which accepts and authenticates images subjected to user specified content manipulations, such as cropping, shifting and image intensity adjustment.

Yet another object of the present invention is to provide an image authenticator which accepts and authenticates images subjected to JPEG image compression.

In accordance with a first embodiment of the present invention a system for authentication of a digital image includes a signature generator and an authentication processor. The signature generator includes an image analyzer which receives an original digital image, parses the image into block pair and generates invariant features of the image based on a relationship between corresponding pixels in the block pairs. Preferably, the signature generator also includes an encryption processor for encoding the invariant features generated by the image analyzer in accordance with encryption key data, thereby providing an encrypted signature for the image. The authentication processor receives a digital image to be authenticated as well as the signature for the original image. When the signature is encrypted, the authentication processor includes a decryption processor for decrypting the signature in accordance with decryption key data to extract the invariant features of the original image. The authentication processor further includes means for extracting coefficients of the image to be authenticated and an authentication comparator. The authentication comparator receives the coefficients of the image to be authenticated, extracts invariant features of the image to be authenticated based on a relationship between corresponding coefficients and compares the invariant features from the original image to those of the image to be authenticated to provide a signal indicative of an authentication failure if the corresponding features are not substantially equal.

Preferably, the relationship between corresponding pixels used to form the invariant features is the polarity of the difference of discrete cosine transform coefficients of corresponding coefficient locations in pairs of non-overlapping blocks of the image. The relationship preferably further includes the relative magnitude of the difference of discrete cosine transform coefficients of corresponding coefficient locations in the pairs of non-overlapping blocks of the image.

Preferably, the authentication system of the present invention can accept digital image data in the form of a raw image or a JPEG compressed bit stream. When the digital image to be authenticated is in the form of a raw image, the means for extracting invariant features includes a discrete cosine transform processor which receives the raw image and provides discrete cosine transform coefficients representing the raw image to the authentication comparator. When the digital image to be authenticated is in the form of a JPEG compressed image bit stream, the means for extracting invariant features includes a JPEG decoder which provides discrete cosine transform coefficients representing the raw image to the authentication comparator.

In accordance with another form of the present invention, a signature generator for providing a robust digital signature for a digital image includes an image analyzer which receives an original digital image, parses the image into at least one image block pair and generates substantially invariant features of the image. The invariant features correspond to a relationship between corresponding coefficient values in block pairs which remains unaltered during allowable image manipulations.

The relationship between corresponding coefficients includes the polarity of the difference of discrete cosine transform coefficients of corresponding coefficients locations of image block pair. Preferably, the relationship further includes the relative magnitude of the difference of discrete cosine transform coefficients of corresponding locations of the image block pairs.

In accordance with another form of the present invention, a digital image authenticator is formed for receiving data representing a digital image to be authenticated and a digital signature for the original image. The authenticator includes means for generating coefficients from the data representing the image to be authenticated, means for extracting invariant features for the original image from the digital signature and an authentication comparator. The authentication comparator receives the coefficients from the generating means and generates invariant features for the image to be authenticated from the coefficients. The authentication comparator then compares corresponding invariant features of the present image to those invariant features from the original image and provides a signal indicative of an authentication failure if the corresponding invariant features do not exhibit an expected relationship.

The expected relationship is at least partially defined by the polarity of the difference of discrete cosine transform coefficients of corresponding locations in non-overlapping block pairs of the image. Preferably, the expected relationship is further defined by the magnitude of the difference of discrete cosine transform coefficients of corresponding locations in non-overlapping block pairs of the image.

In accordance with a method of the present invention, an invariant feature for a digital image is formed by the following steps: partitioning the image into a plurality of image blocks; assigning image block pairs from the plurality of image blocks; extracting DCT coefficients in the image block pairs and determining an invariant relationship between corresponding coefficients DCT of the image block pairs.

In this method, the relationship is at least partially defined by the polarity of the difference of corresponding coefficients. Preferably, the relationship is further defined by the magnitude of the difference of the corresponding coefficients.

BRIEF DESCRIPTION OF THE DRAWINGS

Exemplary embodiments of the present invention will be described in detail with reference in the accompanying drawings, in which.

DETAILED DESCRIPTION OF PREFERRED EMBODIMENTS

Figure 2:
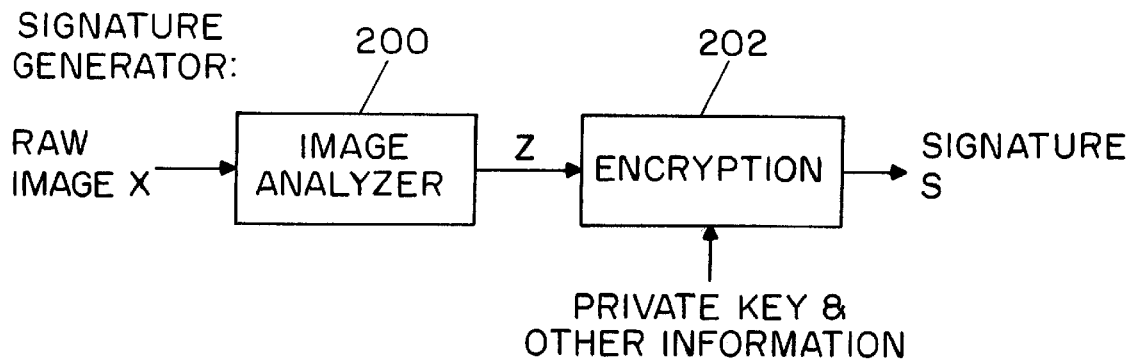
FIG. 2 is block diagram of a system for generating a signature of an image in accordance with the present invention.

FIG. 2 is a block diagram of a system for generating a robust digital signature which employs invariant features of an image which survive lossy image compression and other allowable image transformations. A raw image X is first applied to an image analyzer 200 which performs image feature extraction, resulting in an extracted feature set Z. The image analyzer 200 identifies and extracts features of the image which remain unchanged after the performance of an allowable operation on an image, such as JPEG compression. Following the image analyzer 200 is an encryption processor 202 which applies known encryption methods, such as public key encryption, to the extracted feature set Z to form the resulting digital signature S of the image X.

To illustrate the principles of the present invention, the description herein focuses primarily in the context of JPEG compression. However, it will be understood that image authentication following other allowable image transformations, such as cropping, translation, intensity shifting and the like, is also within the scope of the present invention.

In broad terms, JPEG compression operates in two steps. First discrete cosine transform (DCT) coefficients are extracted and quantized. Second, the DCT coefficients are subjected to entropy encoding. The first process is a lossy operation wherein pixel values are altered. While the goal is to maintain the integrity of the image, some distortion is introduced by this step and certain features of the image are altered. The second operation, i.e., entropy encoding, is a lossless operation which efficiently represents the information without altering the contents of the information. Accordingly, in order to provide a set of robust invariant features, the image processor 200 extracts features of the image which are not altered by the first process of JPEG encoding.

Figure 1A:
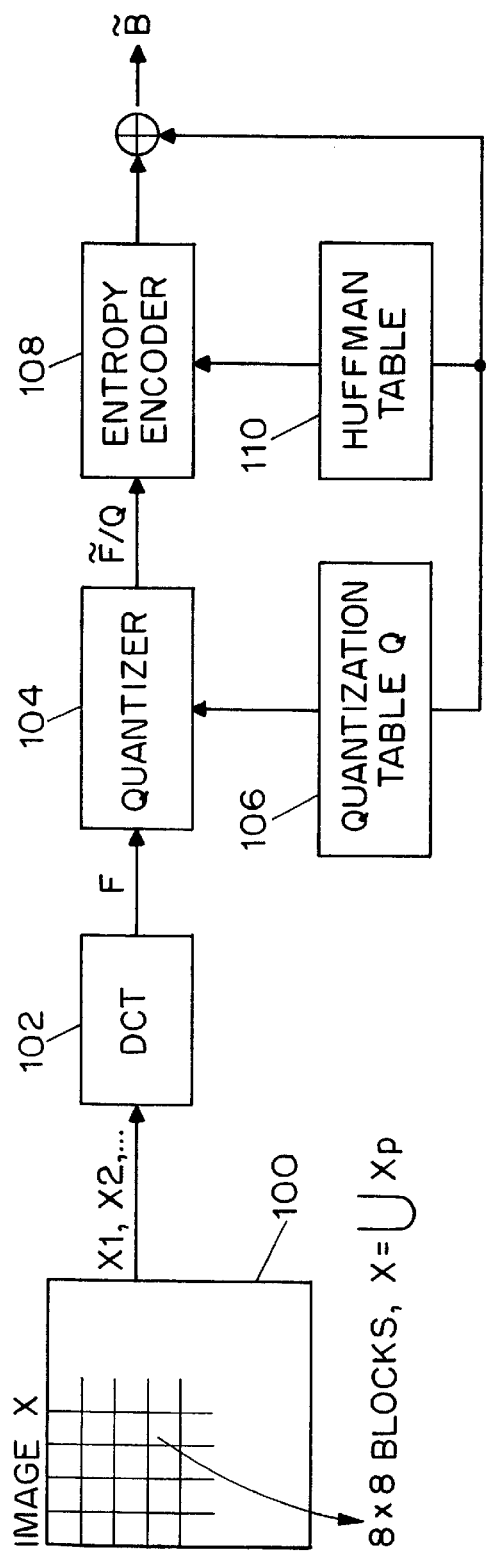
FIG. 1A is a block diagram of an encoding system, known in the prior art, for performing JPEG image compression.
Figure 1B:
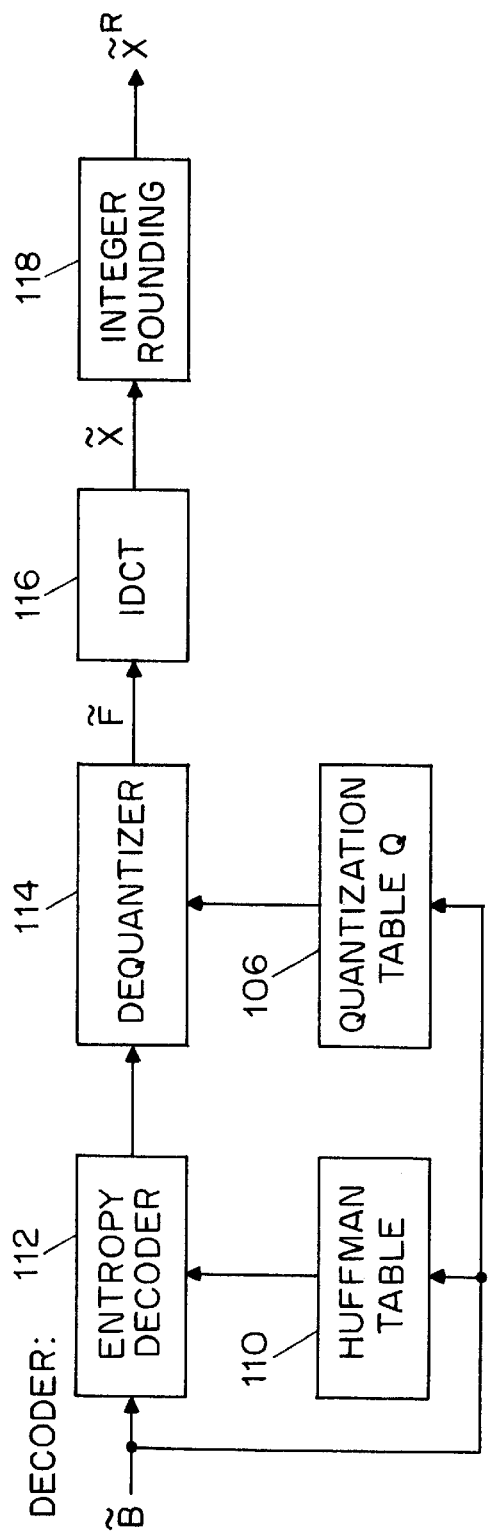
FIG. 1B is a block diagram of a decoding system, known in the prior art, for substantially restoring an image subjected to JPEG image compression.

Referring to FIG. 1A, the matrices of DCT coefficients $F_p$ from the DCT processor 102 are applied to quantizer 104 and are operated on by a common quantization table 106. As a result, the relationship between DCT coefficients of the same coordinate position in two arbitrary blocks of the image will remain unchanged by the quantization process. However, because of rounding operations, the relationship of the two may remain unchanged or may become equal. These fundamental properties are expressed below as theorem 1:

Theorem 1 Assume $F_p$ and $F_q$ are DCT coefficient vectors of two arbitrarily 8×8 nonoverlapping blocks of an image X, and Q is the quantization table of JPEG lossy compressions. $\forall v \in [1, \ldots, 64]$ and $p, q \in [1, \ldots \rho]$, where $\rho$ is the total number of blocks. Define $\Delta F_{p,q} = F_p - F_q$ and $\Delta \tilde{F}p,q = \tilde{F}_p - \tilde{F}_p$ where $\tilde{F}_p$ is defined as $$\tilde{F}_p(v) \equiv \text{Integer Round}\left(\frac{F_p(v)}{Q(v)}\right) \cdot Q(v).$$

Then, the following properties are true:
  if $\Delta F_{p,q}(v) > 0$, then $\Delta \tilde{F}_{p,q}(v) \geq 0$
  else if $\Delta F_{p,q}(v) < 0$, then $\Delta \tilde{F}_{p,q}(v) \leq 0$,
  else $\Delta F_{p,q}(v) = 0$, then $\Delta \tilde{F}_{p,q}(v) = 0$.

Theorem 1 indicates that the sign relationship of corresponding features of two blocks in an image remains unchanged as a result of JPEG compression. However, theorem 1 does not address the relative magnitude of these features. In some practical cases, the quantization table Q is known or can be estimated in the authenticator. This is true in the case of JPEG compression where the JPEG compression file includes the quantization table used to compress the image. If a recompression process is not allowed, i, e., the image can not be compressed, decompressed and compressed again, this quantization table will be the only one that has been used during the compression process. Therefore, the DCT coefficients after compression will be limited in a specific range according to the following theorem:

Theorem 2 Using the parameters defined in Thorem 1, assume a fixed threshold $k \in R$. $\forall v$, define $$\tilde{k}_v \equiv \text{Integer Round}\left(\frac{k}{Q(v)}\right).$$

Then,
  if $\Delta F_{p,q}(v) > k$, $$\Delta \tilde{F}_{p,q}(v) \geq \begin{cases} \tilde{k}_v \cdot Q(v), & \frac{k}{Q(v)} \in Z, \\ (\tilde{k}_v - 1) \cdot Q(v), & \text{elsewhere,} \end{cases} \quad (5)$$

else $\Delta F_{p,q}(v) > k$, $$\Delta \tilde{F}_{p,q}(v) \leq \begin{cases} \tilde{k}_v \cdot Q(v), & \frac{k}{Q(v)} \in Z, \\ (\tilde{k}_v + 1) \cdot Q(v), & \text{elsewhere,} \end{cases} \quad (6)$$

else $\Delta F_{p,q}(v) = k$, $$\Delta \tilde{F}_{p,q}(v) \leq \begin{cases} \tilde{k}_v \cdot Q(v), & \frac{k}{Q(v)} \in Z \\ (\tilde{k}_v \text{ or } \tilde{k}_v \pm 1) \cdot Q(v), & \text{elsewhere} \end{cases} \quad (7)$$

In Theorem 2, k is a designated threshold value used to bound the difference of two DCT coefficients of the same position in two separate 8×8 blocks of an image. In contrast, Theorem 1 only describes the invariance property of the sign of $\Delta F_{p,q}$. Therefore, Theorem 1 can be considered a special case of Theorem 2 (with k set to be 0). Several different k's (e.g., a series of binary division factors over a fixed dynamic range) can be used for a single authentication system of different levels of strength. Based on Theorem 2, we can read the quantization table Q from a bitstream and use Equations (5), (6) and (7) to predict the difference relationships those coefficients have after compression.

Figure 3:
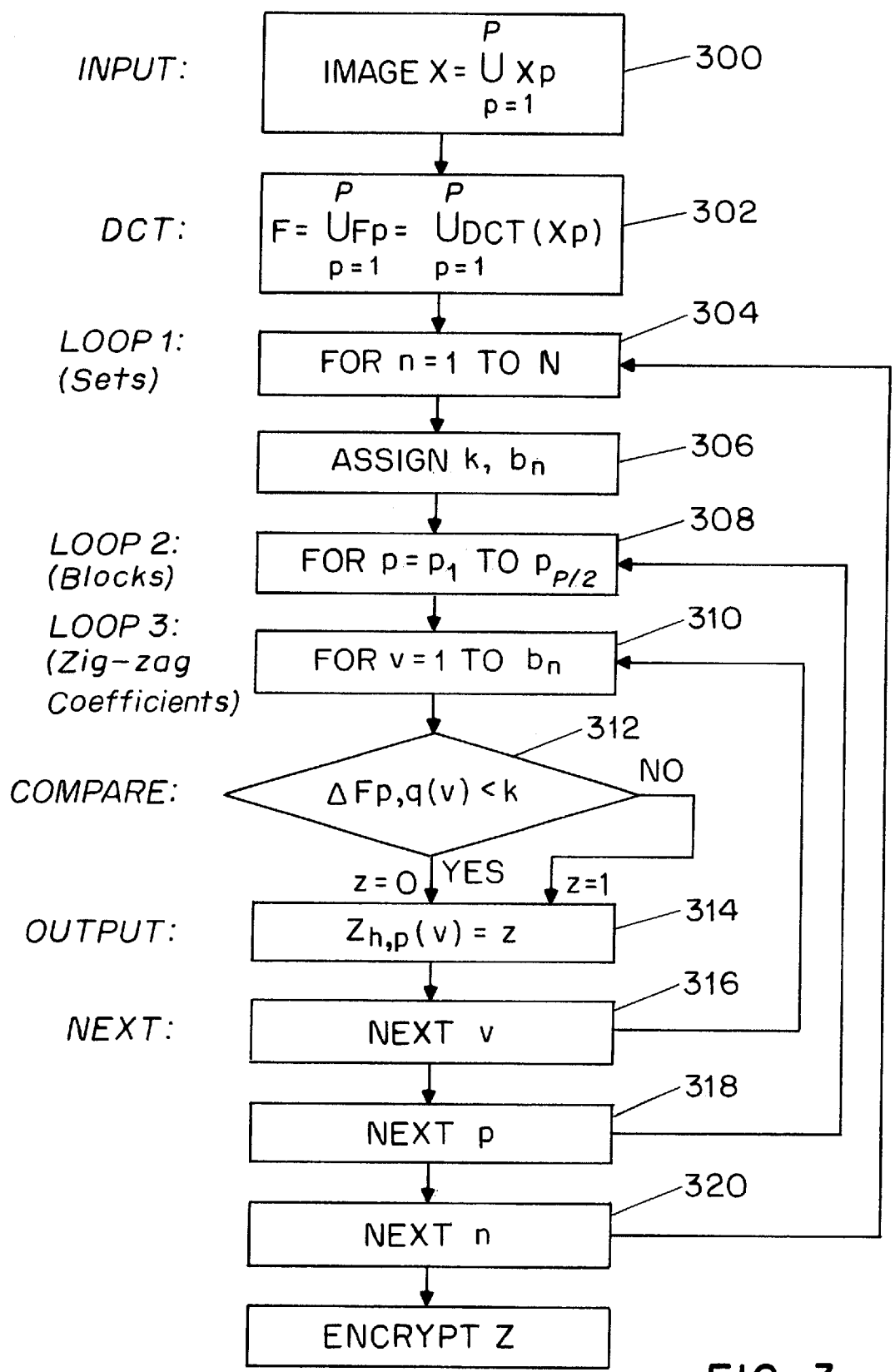
FIG. 3 is a flow chart illustrating a method of extracting invariant feature codes of an image from the relationship of DCT coefficients in corresponding positions in two separate image blocks.

Employing the principles of Theorem 1 and 2, a signature generator, as illustrated in FIG. 2, operates in accordance with the method steps depicted in FIG. 3 to extract invariant features from an image and create a robust digital signature. Referring to FIG. 3, an image X is first partitioned into P blocks, corresponding to the blocks used for JPEG compression (step 300). Next, for each of the P blocks, the matrix of DCT coefficients is generated (step 302). The extraction of the invariant features is then performed using three iterative, nested loops beginning at steps 304, 308 and 310, respectively.

Step 304 is the start of the first (outermost) loop and defines the number of sets feature codes (N) which will be generated. Step 308 is the start of the second (intermediate) loop which operates as a block counter index. Step 310 is the start of the third (innermost) loop which is a coefficient counter which operates in accordance with the number of bits ($b_n$) which are allocated in each block.

For each iteration of the first loop, the threshold value k and the number of bits allocated ($b_n$) for feature extraction for each set, introduced in theorem 2, are varied to provide protection of the magnitude of coefficient difference in the DCT domain (step 306). During the first iteration of the first loop, k is assigned a value of 0, thereby protecting the sign relationship, $\Delta F_{p,q}$ in accordance with Theorem 1. In this first set, ($b_n$) should have a maximum value. From the second to the Nth iteration of the first loop, the magnitude of k is first assigned a value which is capable of binary division and is then divided in half for each increment of N. The first non-zero value of k can be estimated by evaluating this maximum range of $\Delta F(v)$ and assigning the value 2·k to be equal to the highest power of two within the maximum range. For example, if the maximum range of $\Delta F(v)$ was found to be equal to 160, then 2·k=128 and k=64 for n=2. K is then reduced in a binary fashion for subsequent iterations of n. This progressive binary reduction of k serves to protect the magnitude relationship of $\Delta F_{p,q}$ with greater accuracy in each iteration.

While processing commences in the third loop, the magnitude of k remains constant, however, the polarity (sign) of k depends on the result of the test $\Delta F(v)<k$ for the previous value of n. For example, if for n=1, the value of $Z(v)$ was 0, i.e., $\Delta F(v)<k$, then k would be assigned a negative value of the current magnitude. On the other hand, if $Z(v)$ was 1, then k is assigned a positive value at the current magnitude. This relationship can be described by the following closed form mathematical expression for k:

$$k = k_{n,p}(v) = \zeta \sum_{i=1}^{n-1} \left(\frac{1}{2}\right)^i (-1)^{Z_{i,p}(v)+1}, n > 1 \quad (8)$$

where $\zeta$ is a constant which is a power of two and within the maximum range of $\Delta F(v)$.

The third loop is where the actual feature extraction for the selected block pairs takes place. For a given threshold value, the difference of coefficients in corresponding locations in the selected block pairs is determined. The difference value is then compared against the current threshold value k (step 312). If the value of $\Delta F_{p,q}(v)$ is less than the threshold value k, the corresponding bit z of the feature vector $Z_{n,p}(v)$ is assigned a value of zero (step 314). If the value of $\Delta F_{p,q}(v)$ is greater than or equal to the threshold value, the corresponding bit z of the feature vector $Z_{n,p}(v)$ is assigned a value of one (step 314). The counter value for the third loop is then incremented and if $v \leq b_n$ (step 316), processing in the third loop is repeated from step 310. Once all $b_n$ iterations of the third loop have been performed for the current block pair, the block counter is incremented and tested (step 318). If there are still block pairs to process, the third loop is repeated with the new block pair. After all blocks have been processed for given values of k on $b_n$, the set counter n is incremented (step 320) and the process repeats from step 304. From the operation of FIG. 3, N sets of feature vectors $Z_{n,p}(v)$ are generated for each block pair of the image. After the feature vectors are generated in this fashion, they are encrypted (step 322) by the encryption processor 202 (FIG. 2) to generate the robust signature for the image.

Figure 4:
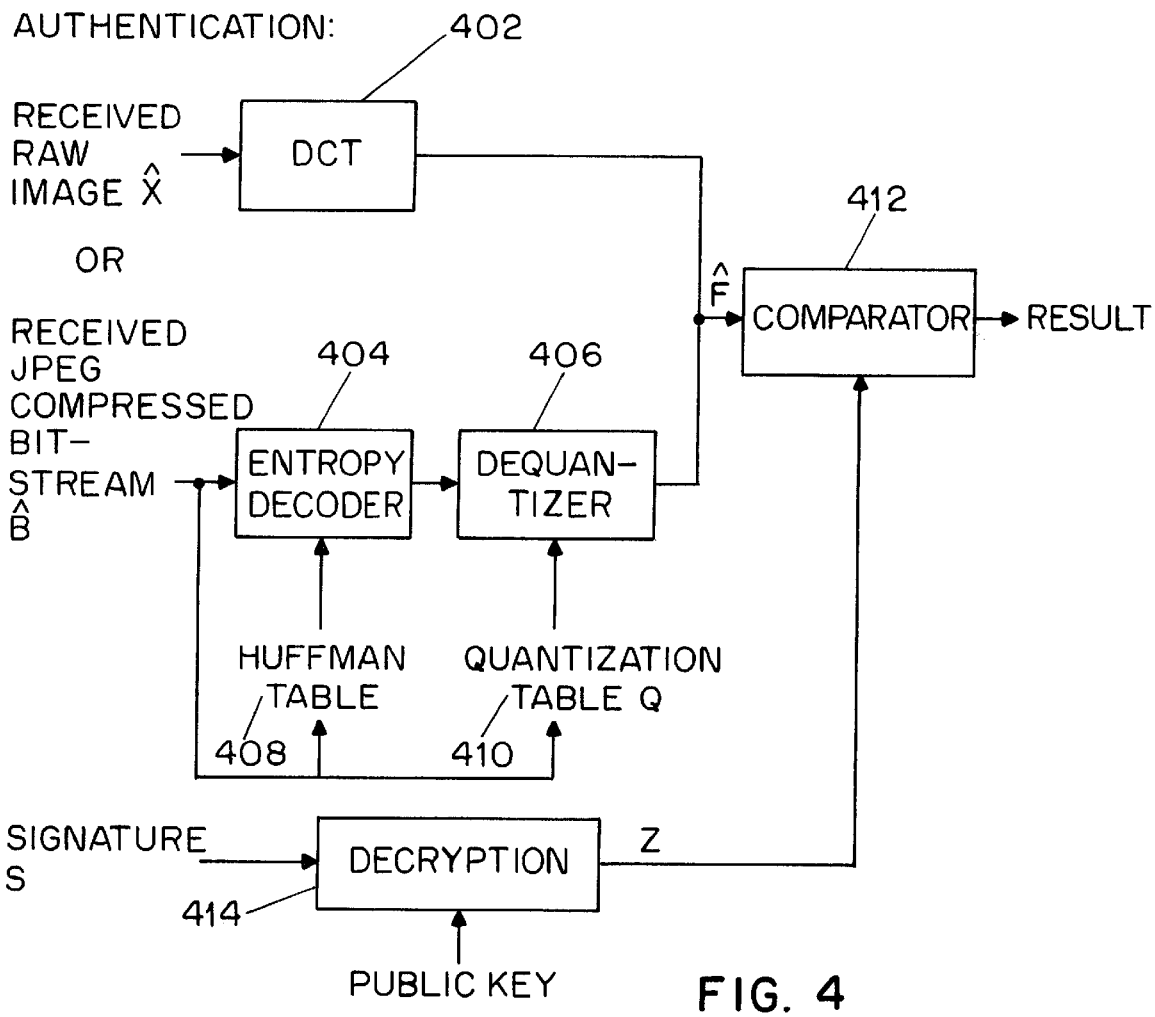
FIG. 4 is a block diagram of an image authentication system, formed in accordance with the present invention.

FIG. 4 is a block diagram illustrating an embodiment of an authentication system formed in accordance with the present invention. The authentication system receives an image to be authenticated as either a raw image $\hat{X}$ or a JPEG compressed bit stream $\hat{B}$. A raw image to be authenticated is applied to a DCT processor 402, which is equivalent to that used in the JPEG compression process, to extract the DCT coefficients of the image. A JPEG compressed bit stream to be authenticated is first applied to an entropy encoder 404 and then a dequantizer 406 to provide the DCT coefficients of the compressed image. The entropy encoder 404 and dequantizer 406 receive the Huffman table 408 and quantization table 410, respectively, from the compressed bit stream and function in an equivalent manner to the JPEG decoders which are known in the art.

The authentication system also receives the robust signature S which was generated for the image. The signature is applied to a decryption processor 410 which removes the encryption from the signature to extract the invariant feature vector Z for the original image. The DCT coefficients of the current image, which are extracted from either the raw image or a JPEG compressed bit stream, and the invariant feature vector Z from the original image are applied to an authentication comparator 412.

Figure 5:
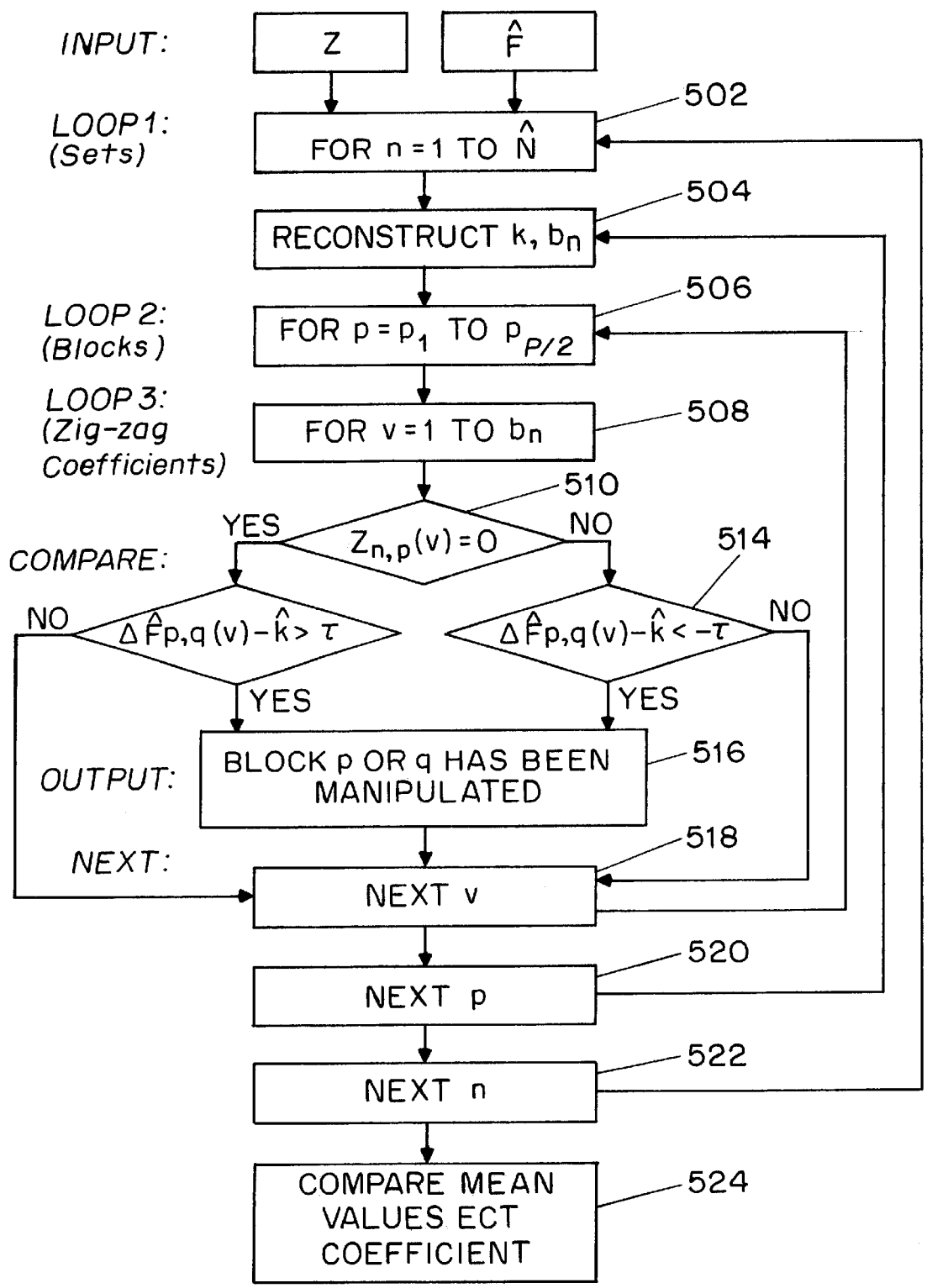
FIG. 5 is a flow chart illustrating a method of authenticating an image using invariant feature codes of the encoded image, in accordance with the present invention.

The authentication comparator 412 is a digital processor which preferably operates in accordance with the method depicted in the flow chart of FIG. 5. As with the previously discussed encoding process of FIG. 3, the authentication process of FIG. 5 operates in three nested processing loops. Step 502 is the start of the first (outermost) loop and defines the number of sets of feature codes (N) which will be used for authentication. In some cases, this number can be less than the number of loops used by the image analyzer to generate the sets of feature codes. In these cases, only a subset of the feature codes are evaluated to determine authenticity. Step 506 is the start of the second (intermediate) loop which operates as a block counter index. Step 508 is the start of the third (innermost) loop which is a coefficient counter defined by the number of bits ($b_n$) used form the current feature vector for the current value of n. The number of iterations in both the second and third loops correspond to the number of iterations performed in the corresponding loops performed by the image analyzer during the encoding process of FIG. 3.

Inside the third loop, the DCT coefficient relationships obtained from the original image, are compared to those of the image subjected to authentication.

From Theorem 2, we can define $$\hat{k} = \begin{cases} \tilde{k}_v \cdot Q(v), & \frac{k}{Q(v)} \text{ is an integer,} \\ (\tilde{k}_v + 1) \cdot Q(v), & \frac{k}{Q(v)} \text{ is an integer and } Z_n(v) = 0, \\ (\tilde{k}_v - 1) \cdot Q(v), & \frac{k}{Q(v)} \text{ is not an integer and } Z_n(v) = 1. \end{cases} \quad (9)$$

(It should be noted that $\hat{k}$ is a function of v, p, and n)

Observe from FIG. 3(*b*), if $Z_n(v)=0$, that is, $\Delta F_{p,q}(v)<k$, then $\Delta F_{p,q}(v)-\hat{k}<0$, must be satisfied. Therefore, if $\Delta F_{p,q}(v)-\hat{k}>0$, some parameters of block p or q have been modified. Similar results can be obtained in the case of $\Delta F_{p,q}(v) \geq k$.

However, because integer rounding noise may be introduced if the image is converted back to integer pixel values during the decode-reencode process, if the compressor and the signature generator use different chromatic resolution decimation algorithms for color images, or if the JPEG compressor calculates non-so-precious DCT, a tolerance bound τ must be used in the detection function. In accordance with this observation, the comparing process is augmented by Proposition 1:

Proposition 1: Block p or q can be claimed aas being manipulated if $$\Delta F_{p,q}(v) - \hat{k} > \tau, \quad (10)$$

for the case of $\Delta F_{p,q}(v) - k < 0$, (or equivalently $Z_n(v)=0$); or if $$\Delta F_{p,q}(v) - \hat{k} > -\tau,$$

for the case of $\Delta_{p,q}(v) - k \geq 0$, (or equivalently $Z_n(v)=1$.)

The above stated principles are implemented in FIG. 5 beginning with step 508. For each bit position in the selected image block pairs, the binary value of the corresponding bit of the invariant feature vector Z is tested (step 510). If the value of the corresponding feature bit $Z_{n,p}(v)$ is equal to zero, and the difference in bit values of the block pairs of the current image minus the current value of k is greater than a predetermined threshold value τ, then one of the blocks p,q of the current block pair has been manipulated (step 512). Similarly, if the value of the corresponding feature bit $Z_{n,p}(v)$ is equal to one (step 510), and the difference in bit values of the block pairs of the current image minus the current value of k is less than −τ, this condition also indicates that one of the blocks p,q of the current block pair has been manipulated (step 514). If the conditions in steps 512 and 514 are not true, i.e., the image block has not been manipulated, the method advances to step 518, which routes control back to step 508 if additional bit locations for the current block pair p,q require testing. Otherwise, the next block pair is selected and the third loop is performed again from the first bit position (step 520). After each block pair has been tested in this manner, the next set of invariant feature vectors are selected by incrementing the first loop (step 522), selecting the next values of k and $b_2$ (step 504) and repeating the second and third processing loops as previously described.

The threshold variable τ is introduced to prevent false alarms from occurring as a result of noise introduced by the compression process as well as through round off errors that occur throughout the processing steps. The value of τ is determined based on the probability of a false alarm occurring in a given system. In practice, computer software and hardware calculate the DCT coefficients with finite precision. For some cases, not only the input and the output of DCT operations are integers, but also some of the intermediate values are integers as well. This adds rounding noises to the DCT coefficient values. Other noises are introduced from the integer rounding process of the quantized DCT values. In general, the integer value of rounding a real number is its nearest integer. However, some application software may drop small values in the high frequency positions. In other words, the rule of integer rounding may change at different DCT positions when using different software. Combining these considerations, Eq.(2) can be modified as follows:

$$\tilde{f}_p(v) = \text{Integer Round}\left(\frac{F_p(v) + N_d}{Q(v)}\right) + N_r, \quad (11)$$

where $N_d$ is the noise associated with the DCT operation and $N_r$ is the noise of integer rounding. Both $N_d$ and $N_r$ are random variables. $N_d$ usually depends on specific system implementations and the number of recompression processes. In most systems, as the rounding rules are consistent across and positions and the value of $N_r$ can be assumed to be zero.

The probability of a false alarm of a block pair, $P_f$, represents the probability that at least one DCT difference value in the block pair triggers the detector in Proposition 1, merely because of the effect of rounding noise. We can write $P_f$ as $$P_f = \sum_{n=1}^{N}\sum_{v=1}^{b} \alpha_{n,v} \quad (12)$$

where $\alpha_{n,v}$ is the probability that a DCT difference value $\Delta \tilde{F}_{p,q}(v)$ does not satisfy the constraint of $Z_n(v)$. That is, $$\alpha_{n,v} = \begin{cases} P[\Delta \tilde{F}_{p,q}(v) - \hat{k} < -\tau], & given \Delta \tilde{F}_{p,q}(v) \geq k, \\ P[\Delta \tilde{F}_{p,q}(v) - \hat{k} > \tau], & given \Delta \tilde{F}_{p,q}(v) < k. \end{cases} \quad (13)$$

Because of symmetry, these two probabilities will be the same. If the probability density function (pdf) of $N_d$ is known, then the probability of a false alarm can be found as follows.

First, define a random variable $$N_{d,p}, s.t., f_p + \frac{1}{2} + N_{d,p} \equiv \text{Integer Round} \frac{F_p(v) + N_{d,p}}{Q(v)}$$

where $$f_p = \frac{F_p(v)}{Q(v)}.$$

The associated probability density function is $$P[N'_{d,p} = n_d] = P\left[\left(n_d + \left\lfloor f_p + \frac{1}{2}\right\rfloor - f_p + \frac{1}{2}\right) \cdot Q(v) > \right.$$
$$\left. N_{d,p} \geq \left(n_d + \left\lfloor f_p + \frac{1}{2}\right\rfloor - f_p - \frac{1}{2}\right) \cdot Q(v)\right] \quad (14)$$

The probability density function of $N'_{d,q}$ can be obtained in a similar way. With some transformations, $\alpha_{n,v}$ is stated as:

$$\alpha_{n,v} = P\left[N_{d,p} - N'_{d,p} < \hat{k}' - \tau' - \left\lfloor f_p + \frac{1}{2}\right\rfloor + \left\lfloor f_p + \frac{1}{2}\right\rfloor\right]. \quad (15)$$

where $$\hat{k}' = \frac{\hat{k}}{Q(v)} \text{ and } \tau' = \frac{\tau}{Q(v)}.$$

The symbol of $\lfloor . \rfloor$ represents the 'floor' function.

From Eq. (12), Eq. (14), and Eq. (15), the user of the image authenticator can set a suitable tolerance value τ depending on the quantization table reconstructed from the bitstream, the estimated variances of noises, and the thresholds. However, in practical applications, the user must assume the pdf of $N_r$ a priori. If the model assumption of $N_r$ is not available, rules of thumbs can be used to set $\tau$ to zero for a JPEG bitstream which is directly compressed from an original gray-level image, or $Q(v)$ for color images and most other cases.

In the case where the image is manipulated by adjusting the intensity of all pixels in a given image block (i.e., lightening or darkening an image), the methods described above will not detect such a manipulation. Because the manipulation is performed on a uniform basis, the invariant properties of Theorems 1 and 2 are not violated. In order to detect such a manipulation, the mean value of DCT coefficients of the original image is compared to the mean value of the DCT coefficients of the present image (step 524). If these values are not substantially equal (i.e., within a reasonable tolerance bound of each other), the intensity of the image has been altered. If this form of manipulation is not permitted, a suitable authentication error can be generated.

Example

A 16×8 image segment (i.e., two 8×8 blocks) is presented to illustrate operation of the present image authenticator. The pixel values of this small image are shown below in Table 1. This image is divided into two 8×8 blocks in the JPEG compression process. Therefore, $\rho=2$. The DCT coefficients of these two blocks are shown in Table 2. For simplicity, only integer values of them are shown in the table.

then be 10 bits. From Table 2, $F_1(0,0)=486$ and $F_2(0,0)=727$. This position (0,0) is the first value in the zig-zag order. The two-dimensional representation of $F_1(0,0)$ and $F_2(0,0)$ is transformed to a one-dimensional representation where $F_1(1)$ and $F_2(1)$ and $\Delta F_{1,2}(1)=-241<0$ is obtained. Therefore, the first bit of the feature codes, Z, is 0. The second coefficients in the zig-zag order are: $F_1(2)=91$ and $F_2(2)=-188$, respectively. Since $\Delta F_{1,2}(2)=279>0$, the second bit of the feature codes is 1. This procedure goes on until $v=10$.

The resulting feature codes, Z, are: 0111100110.

For an example of a case using longer feature codes, the loop counter can be set at N=4, with values of $b_n$ of $b_1=10$, $b_2=6$, $b_3=3$ and $b_4=1$. The reason for a decreasing number of $b_n$ is two fold. First, the case of k=0 is the most robust test for authenticity and is therefore weighted with the most number of bits. Second, the lower frequency coefficients need more protection than the higher frequency ones. Following the procedure just described for N=1, the first 10 bits of Z are the same as the previous case. The sign of the threshold values, k's, in the second set of Loop 1 depend on the $Z_1$ codes in the first set. In the first comparison of the second set, k is set to be a negative value, such as −128, because it is known that $\Delta F_{1,2}(1)<0$ in the calculation of the first set. Since $\Delta F_{1,2}(1)=-240.875<-128$, the 11th bit of Z is 0. Similarly, in the second comparison, since $\Delta F_{1,2}(2)>0$ in the first set, the threshold k is assigned a positive value. This assignment of the polarity of k takes place in accordance with equation (8). Therefore, $\Delta F_{1,2}(2)=279>128$ and the 12th bit of Z is 1. A similar procedure continues until n=4. The resulting feature codes Z are: 01111001100100010110. The length of Z is equal to $\Sigma_{n=1}^{4} b_n=20$. Preferably, the

TABLE 1

Pixel values of a small image of two 8 blocks

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 114 | 105 | 93 | 81 | 61 | 34 | 36 | 36 | 53 | 70 | 106 | 130 | 150 | 152 | 153 | 157 |
| 1 | 113 | 130 | 127 | 109 | 88 | 74 | 54 | 45 | 36 | 32 | 41 | 67 | 112 | 138 | 145 | 145 |
| 2 | 72 | 118 | 131 | 117 | 90 | 97 | 63 | 63 | 56 | 50 | 47 | 51 | 71 | 104 | 138 | 138 |
| 3 | 26 | 67 | 116 | 80 | 61 | 66 | 68 | 88 | 68 | 76 | 65 | 69 | 68 | 91 | 116 | 126 |
| 4 | 16 | 30 | 47 | 24 | 20 | 25 | 52 | 87 | 65 | 92 | 85 | 81 | 82 | 89 | 102 | 116 |
| 5 | 21 | 25 | 26 | 25 | 16 | 11 | 14 | 28 | 85 | 106 | 92 | 91 | 89 | 93 | 104 | 111 |
| 6 | 16 | 38 | 67 | 57 | 28 | 18 | 14 | 13 | 27 | 75 | 102 | 97 | 90 | 92 | 100 | 107 |
| 7 | 28 | 70 | 151 | 150 | 88 | 36 | 13 | 12 | 14 | 42 | 88 | 99 | 89 | 90 | 99 | 101 |

TABLE 2

DCT coefficients of 8 × 8 blocks of Table 1

| | $F_1$ (x, y) | | | | | | | | $F_2$ (x, y) | | | | | | | |
|---|---|---|---|---|---|---|---|---|---|---|---|---|---|---|---|---|
|   | 0 | 1 | 2 | 3 | 4 | 5 | 6 | 7 | 0 | 1 | 2 | 3 | 4 | 5 | 6 | 7 |
| 0 | 486 | 91 | −66 | −91 | −17 | −1 | 14 | 0 | 727 | −188 | −3 | −28 | −16 | −4 | −6 | −1 |
| 1 | 140 | 41 | 44 | 35 | −8 | −12 | −6 | −4 | 51 | −77 | 22 | 45 | 11 | 1 | 2 | 3 |
| 2 | 43 | 108 | −54 | 5 | 16 | 13 | −9 | 0 | 31 | −52 | −73 | −8 | 5 | 5 | 10 | 7 |
| 3 | −143 | −21 | 84 | 34 | 22 | 0 | −12 | 6 | 73 | 40 | −21 | −7 | 1 | −13 | −2 | −2 |
| 4 | 9 | 18 | 2 | −32 | 8 | 5 | 5 | 12 | 19 | 12 | −21 | −17 | 4 | 2 | 2 | −1 |
| 5 | −23 | −9 | 1 | −1 | −8 | 1 | 2 | 0 | 20 | 15 | −2 | −17 | −5 | 2 | 0 | −1 |
| 6 | 3 | 10 | −14 | 4 | 6 | −1 | −1 | −6 | 16 | 16 | 13 | 1 | 2 | 6 | −2 | 0 |
| 7 | −8 | −10 | 14 | 3 | −1 | −2 | −2 | −3 | −1 | −3 | −6 | −12 | −6 | −1 | 1 | 3 |
| | | | | (a) | | | | | | | | (b) | | | | |

First, the case of N=1 is considered, i.e., only one set which contains the threshold value k=0 is used for feature code generation. Assume the first 10 coefficients ($b_1=10$) of the two DCT coefficients blocks are compared to generate the feature codes. The length of the features codes, Z, will feature codes Z obtained are then encrypted by a private key. For the sake of simplicity, the encrypted signature is not shown in this example.

If the image in Table 1 is compressed by a JPEG compression process with a quantization table Q having a constant matrix with all its values equal to 16, the resulting values of $\tilde{F}_1$ and $\tilde{F}_2$ are shown in Table 3. The values are entropy encoded and compose a JPEG bitstream $\tilde{B}$ which is sent to the authenticator. In the authenticator, $\hat{F}_1 = \tilde{F}_1$ and $\hat{F}_2 = \tilde{F}_2$. According to the process in FIG. 5, $\Delta \hat{F}_{1,2}$ is compared to the feature codes Z. For instance, since $\Delta \hat{F}_{1,2}(1) = -240 < 0$ and $Z_1(1) = 0$, this value is authenticated to be true. If $\hat{N} = 4$, the comparison of the magnitude of the coefficient difference is performed over four passes through the process. For the case of $\hat{N} = 1$, only the sign of the coefficients is compared. However, in both situations, all values are authenticated a true in the previous example.

TABLE 3

(a) The DCT coefficients $F_1$ of the left 8 × 8 block in Table 1;
(b) The DCT coefficients $F_2$ of the right block

| 480 | 96 | −64 | −96 | −16 | 0 | 16 | 0 | 720 | −192 | 0 | −32 | −16 | 0 | 0 | 0 |
|---|---|---|---|---|---|---|---|---|---|---|---|---|---|---|---|
| 144 | 48 | 48 | 32 | −16 | −16 | 0 | 0 | 48 | −80 | 16 | 48 | 16 | 0 | 0 | 0 |
| 48 | 112 | −48 | 0 | 16 | 16 | −16 | 0 | 32 | −48 | −80 | −16 | 0 | 0 | 16 | 0 |
| −144 | −16 | 80 | 32 | 16 | 0 | −16 | 0 | 80 | 48 | −16 | 0 | 0 | −16 | 0 | 0 |
| 16 | −16 | 0 | −32 | 16 | 0 | 0 | 16 | 16 | 16 | −16 | −16 | 0 | 0 | 0 | 0 |
| −16 | −16 | 0 | 0 | −16 | 0 | 0 | 0 | 16 | 16 | 0 | −16 | 0 | 0 | 0 | 0 |
| 0 | 16 | −16 | 0 | 0 | 0 | 0 | 0 | 16 | 16 | 16 | 0 | 0 | 0 | 0 | 0 |
| −16 | −16 | 16 | 0 | 0 | 0 | 0 | 0 | 0 | 0 | 0 | −16 | 0 | 0 | 0 | 0 |
| (a) | | | | | | | | (b) | | | | | | | |

The following example illustrates where manipulation of the image has taken place. Assume the gray level values illustrated in table 1 of X(0,2) and X(0,3) are modified from 72 and 26 to 172 and 126, respectively. After manipulation, this image is also compressed by JPEG with the same quantization table used as in the previous case. The difference of the DCT coefficients from the compressed bitstream are shown in Table 4. When the compressed bitstream is then sent into the authenticator, the authenticator will indicate the manipulation because the mismatch of the 4th bit of the feature codes Z, 1, and the 4th zig-zag coefficient $\Delta F_{1,2}(4) = -16 < 0$ in Table 4. The manipulation can be indicated by a text message on a display unit (not shown), by highlighting the manipulated blocks of the image on the display on by other suitable methods of annunciating an alarm condition.

TABLE 4

The differential DCT coefficients of the manipulated image

| −208 | 320 | −32 | −32 | −16 | 16 | 32 | 0 |
|---|---|---|---|---|---|---|---|
| 112 | 144 | 48 | 0 | −16 | 0 | 0 | 0 |
| −16 | 128 | 0 | 0 | 0 | 0 | −32 | 0 |
| −256 | −112 | 64 | 0 | 0 | 0 | −32 | 0 |
| 0 | −32 | 16 | −16 | 16 | 0 | 0 | 16 |
| −16 | 0 | 32 | 32 | 16 | 16 | 16 | 0 |
| 0 | 0 | −16 | 16 | 16 | 0 | 0 | 0 |
| −16 | −16 | 16 | 16 | 0 | 0 | 0 | 0 |

The above description is merely illustrative of prepared embodiments and principle involved in the invention. Other modifications of the invention will be obvious to those skilled in the art, and it is intended that the scope of the invention be limited only as set forth in the appended claims.

What is claimed is:

1. A system for authentication of a present digital image, comprising:
   a signature generator, said signature generator including:
      an image analyzer, said image analyzer receiving an original digital image, parsing the image into image block pairs and generating invariant features of said image based on a relationship between corresponding DCT coefficients in said at least one image block pair, said relationship between corresponding DCT coefficients including the polarity of the difference of discrete cosine transform coefficients of corresponding coefficients locations in said image block pairs and the magnitude of the difference of discrete cosine transform coefficients of corresponding coefficients locations in said image block pairs; and
      an encryption processor, said encryption processor encoding the invariant features generated by said image analyzer in accordance with encryption key data to provide an encrypted signature for the original image; and
   an authentication processor, said authentication processor receiving a present digital image to be authenticated and an encrypted signature for the original image, said authentication processor including:
      a decryption processor, said decryption processor receiving the encrypted signature and decoding the signature in accordance with decryption key data to extract the invariant features of the original image;
      means for extracting coefficients of the present image to be authenticated; and
      an authentication comparator, said authentication comparator receiving the coefficients of the present image to be authenticated, extracting invariant features of the present image from the coefficients, comparing the invariant features from the original image to those of the present image and providing a signal indicative of an authentication failure if the corresponding features do not substantially match.

2. A system for authentication, as defined by claim 1, wherein said relationship includes the mean value of discrete cosine transform coefficients of image blocks.

3. A system for authentication, as defined by claim 1, wherein the present digital image to be authenticated is in the form of a raw image and said means for extracting invariant features includes a discrete cosine transform processor, said discrete cosine transform processor receiving the raw image and providing discrete cosine transform coefficients representing the raw image to said authentication comparator.

4. A system for authentication, as defined by claim 1, wherein the present digital image to be authenticated is in the form of a JPEG compressed image bit stream and said means for extracting invariant features includes a JPEG decoder providing discrete cosine transform coefficients representing the raw image to said authentication comparator.

5. A signature generator for providing a robust digital signature for an original digital image comprising an image analyzer, said image analyzer receiving the original digital image, parsing the image into image block pairs and generating substantially invariant features of the image, said invariant features corresponding to a relationship between corresponding pixel values in said image block pairs, wherein said relationship is at least partially defined by the polarity of the difference of discrete cosine transform coefficients of corresponding coefficient locations of said at least one image block pairs and the magnitude of the difference of discrete cosine transform coefficients of corresponding coefficient locations of said at least one image block pair.

6. A digital image authenticator, the authenticator receiving data representing a digital image to be authenticated and a digital signature for the original image, the authenticator comprising:

means for generating coefficients from the data representing the image to be authenticated, said means for generating coefficients representing the data representing the image into a plurality of image blocks;

means for extracting invariant features for the original image from the digital signature; and an authentication comparator, said authentication comparator receiving the coefficients from the generating means, grouping the plurality of image blocks into at least one image block pair and generating invariant features for the image to be authenticated from a relationship between corresponding coefficients which are at least partially defined by the polarity of the difference of discrete cosine coefficients and the magnitude of the difference of discrete cosine transform coefficients of corresponding coefficient locations in the at least one image block pair, said authentication comparator comparing the generated invariant features of the present image to corresponding invariant features from the original image and providing a signal indicative of an authentication failure if the corresponding invariant features do not substantially match.

7. A digital image authenticator, as defined by claim 6, wherein said relationship includes the mean value of discrete cosine transform coefficients in the image block pairs.

8. A digital image authenticator, as defined by claim 6, wherein the data representing the digital image to be authenticated is in the form of a raw image and said means for generating coefficients includes a discrete cosine transform processor, said direct cosine transform processor receiving the raw image and providing discrete cosine transform coefficients representing the raw image to said authentication comparator.

9. A digital image authenticator, as defined by claim 6, wherein the data representing the digital image to be authenticated is in the form of a JPEG compressed image bit stream and said means for extracting coefficients includes a JPEG decoder providing discrete cosine transform coefficients representing the raw image to said authentication comparator.

10. A method for generating an invariant feature for a digital image comprising the steps:

partitioning the image into a plurality of image blocks;

assigning at least one image block pair from said plurality of image blocks;

extracting coefficients for pixels in said at least one image block pair;

determining an invariant relationship between corresponding coefficients of said at least one image block pair, said relationship being at least partially defined by the polarity of the difference and the magnitude of the difference of said corresponding coefficients.

11. A method for authenticating a present image based on a signature generated from invariant features of an original image, comprising the steps:

partitioning the present image into a plurality of image block pairs;

extracting coefficients for the image block pairs;

generating invariant features for the present image to be authenticated from a relationship between corresponding coefficients of at least one image block pair, said relationship being at least partially defined by the magnitude of the difference of said corresponding coefficients;

extracting invariant features for the original image from the signature;

comparing the invariant features of the present image to corresponding invariant features of the original image; and providing a signal indicative of an authentication failure if the corresponding invariant features do not substantially match.

12. A method for authenticating a present image, as defined by claim 11, wherein said relationship is at least partially defined by the polarity of the difference of said corresponding coefficients.

13. A method for authenticating a present image, as defined by claim 11, further including the steps of:

generating a mean value of the coefficients of the original image and the present image; and comparing the mean value of the coefficients of the original image to the mean value of the coefficients of the present image, whereby the intensity of the original image is authenticated.

* * * * *

UNITED STATES PATENT AND TRADEMARK OFFICE
CERTIFICATE OF CORRECTION

PATENT NO. : 6,532,541 B1
DATED : March 11, 2003
INVENTOR(S) : Chang et al.

It is certified that error appears in the above-identified patent and that said Letters Patent is hereby corrected as shown below:

Column 1,
Line 14, "accessability" should read -- accessibility --
Line 67, "O FPIXELS" should read -- of PIXELS --; and "$X = \cup_{p=1}^{P} X_p.$" should read -- $X = \cup_{p=1}^{p} X_p.$ --

Column 2,
Line 23, "$\tilde{f}_p$" should read -- $\tilde{f}_p$ --

Equation (3), "$\tilde{F}_p$" (second occurrence) should read -- $\tilde{f}_p$ --

Line 35, "illustrate" should read -- illustrates --

Column 3,
Line 21, "pair" should read -- pairs --

Column 4,
Line 9, "coefficients" should read -- coefficient --
Line 10, "pair" should read -- pairs --

Column 5,
Line 60, "$\tilde{F}_p - \tilde{F}_p$" should read -- $\tilde{F}_p - \tilde{F}_q$ --

Line 64, "$\tilde{F}_p(v)$" should read -- $\tilde{F}_q(v)$ --

Column 6,
Line 2, "$\geq,0$" should read -- $\geq 0,$ --
Line 13, "i,e.," should read -- i.e., --
Line 20, "Thorem" should read -- Theorem --

Column 9,
Line 10, "aas" should read -- as --

Line 19, "$\Delta F_{p,q}(v) - \hat{k} > -\tau,$" should read -- $\Delta F_{p,q}(v) - \hat{k} < -\tau,$ --

Line 21, "$\Delta_{p,q}(v) - k \geq 0,$" should read -- $\Delta F_{p,q}(v) - k \geq 0,$ --

Column 10,
Line 22, "$\Delta$" should be deleted

Line 23, "$\tilde{F}_{p,q}(v)$" should read -- $\Delta \tilde{F}_{p,q}(v)$ --

UNITED STATES PATENT AND TRADEMARK OFFICE
CERTIFICATE OF CORRECTION

PATENT NO. : 6,532,541 B1
DATED : March 11, 2003
INVENTOR(S) : Chang et al.

It is certified that error appears in the above-identified patent and that said Letters Patent is hereby corrected as shown below:

Column 12,
Line 13, "two fold" should read -- twofold --

Line 30, "$\Sigma_{n=1}^{4} b_n = 20.$" should read -- $\Sigma_{n=1}^{4} b_n = 20.$ --

Column 13,
Lines 4-5, "$\tilde{F}_1 = \tilde{F}_1$" should read -- $\tilde{F}_1 = \hat{F}_1$ --; and "$\tilde{F}_2 = \tilde{F}_2$" should read -- $\tilde{F}_2 = \hat{F}_2$ --

Column 14,
Line 6, "coefficients" should read -- coefficient --

Column 15,
Line 9, "pairs" should read -- pair --

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,532,541 B1 | Page 1 of 1 |
| APPLICATION NO. | : 09/235862 | |
| DATED | : March 11, 2003 | |
| INVENTOR(S) | : Chang et al. | |

It is certified that error appears in the above-identified patent and that said Letters Patent is hereby corrected as shown below:

IN THE SPECIFICATION:
On Page 1, Column 1, line 4, please insert the following header and paragraph:

-- Statement Regarding Federally Sponsored Research or Development
This invention was made with government support under grant number 8811111 awarded by the National Science Foundation. The government has certain rights in the invention. --

Signed and Sealed this

Third Day of June, 2008

JON W. DUDAS
*Director of the United States Patent and Trademark Office*